2,875,627

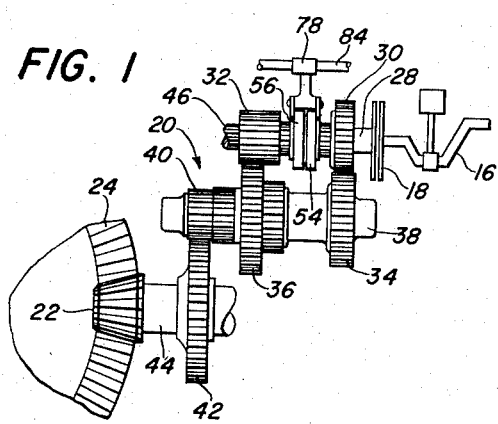
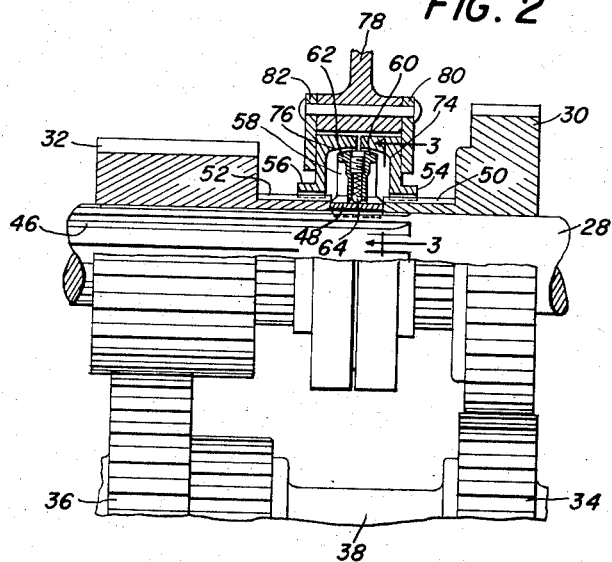
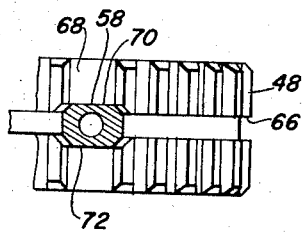
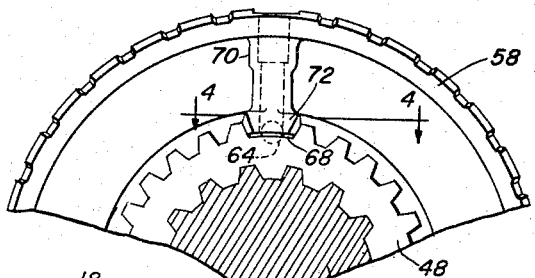
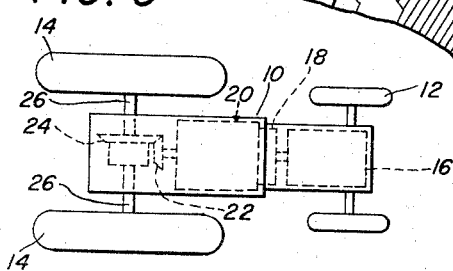
INVENTOR.
V. L. RUGEN &
M. R. CESSNA United States Patent Office 2,875,627
Patented Mar. 3, 1959

SYNCHRONIZING TRANSMISSION

Vernon L. Rugen and Marion R. Cessna, Cedar Falls, Iowa, assignors, by mesne assignments, to Deere & Company, a corporation of Delaware Application June 10, 1955, Serial No. 514,518

4 Claims. (Cl. 74—339)

This invention relates to a synchronizing transmission for vehicles and more particularly to a transmission as used in an agricultural tractor, wherein the problems are somewhat different from those presented in the usual automobile transmission.

The synchronizing transmission provided according to the present invention follows, in the main, general synchronizing principles, to the extent that the desideratum is the synchronizing of speeds prior to their meshing engagement. In the interests of securing proper synchronizing, the shifter drag should be placed on the synchronizer part whose speed will not be changed, such as the part driven by the rear wheels. If the shifter drag were placed on the element whose speed will be changed by the synchronizer clutch, such as the main clutch driven disc and shaft, this drag would increase the synchronizing effort or make synchronizing impossible when the speed of the main clutch driven disc and shaft must be increased. In the conventional automotive synchronizer, the engine and transmission shafts are normally coaxial and journaled for relative rotation, two or more speeds being obtained through a counter shaft or range shaft having one gear in constant mesh with a gear on the engine shaft and another gear in constant mesh with a gear journaled on the transmission shaft. The engine shaft gear and the gear journaled on the transmission shaft are conventionally provided with synchronizer cones between which a central synchronizing member is shiftable for obtaining proper synchronizing before the positive gear clutch or mesh is effected. In contradistinction to this, and according to the transmission disclosed in the present case, a conventional synchronizing arrangement cannot be used, because the engine shaft extends axially through a pair of gears that are driven from the tractor final drive and to utilize the conventional synchronizer would mean placing the shifter drag on the engine shaft rather than on the transmission gears. The manner in which the synchronizing problem is solved will be brought out in detail in the following specification and accompanying sheet of drawings, the several figures of which will be described immediately below.

Fig. 1 is a somewhat schematic view showing a portion of a power train between an engine and the vehicle final drive.

Fig. 2 is a fragmentary enlarged view, partly in section, showing the synchronizer details.

Fig. 3 is an enlarged fragmentary view as seen along the line 3—3 of Fig. 2.

Fig. 4 is a fragmentary view as seen on the line 4—4 of Fig. 3.

Fig. 5 is a plan view, on a considerably reduced scale, showing schematically the power train arrangement as employed in a tractor.

The tractor chosen for the purposes of illustration in Fig. 5 comprises a main body 10 carried on front wheels 12 and rear traction wheels 14. An internal combustion engine 16 operates through an engine clutch 18 to drive a transmission gear set 20 which ultimately transmits power to the traction wheels 14 by means of a final drive including a transmission-driven pinion 22, a differential ring gear 24 and axles 26 to which the wheels 14 are respectively keyed.

The clutch 18, when engaged, connects the engine 16 to an input or engine-powered driving shaft 28. This shaft extends coaxially through and has journaled thereon first and second driven gears 30 and 32. These gears are respectively in constant mesh with counter shaft gears 34 and 36 that are keyed to a counter shaft 38 parallel to the driving shaft 28. Other gears are fixed to the counter shaft 38 for providing a plurality of speed ratios for the output pinion 22, but only one of these gears, indicated by the numeral 40, need be considered here, this gear being in constant mesh with a gear 42 on an output shaft 44 to which the output bevel pinion 22 is keyed.

It will be seen from the description thus far that the speed ratio of the shaft 28 to the shaft 44 will vary according to which of the gears 30 or 32 is connected to the shaft 28. The means for accomplishing clutching and declutching as between the shaft 28 and the gears 30 and 32 will be described below.

The shaft 28 has a splined portion 46 which serves as means for fixing thereto for rotation therewith an externally splined shaft hub 48. The first and second driven gears 30 and 32 respectively have integral therewith first and second externally splined hubs 50 and 52, spaced coaxially apart with the shaft hub 48 between them. Each of the hubs 50 and 52 has external splines like those on the shaft hub 48. First and second internally splined clutch members 54 and 56 are splined respectively to the externally splined hubs 50 and 52, each member being axially shiftable on its hub for engagement with and disengagement from the externally splined shaft hub 48. That is to say, if the clutch member 54 is moved axially to the left of the position shown in Fig. 2, it will remain in splined mesh with the hub 50 but will also effect a splined mesh with the proximate splined portion of the shaft hub 48. Consequently, the hubs 48 and 50 will rotate in unison, meaning that the shaft 28 will drive the gear 30 which in turn will drive the counter shaft 38. Likewise, the clutch member 56 may be shifted to the right from its Fig. 2 position so as to effect a splined interconnection between the hubs 52 and 48, whereby the shaft 28 will drive the counter shaft 38 via the gearing 32—36.

The shaft hub 48 carries externally thereof and for rotation therewith an annular synchronizer element 58 which has first and second axially opposite annular synchronizer portions in the form of external cones 60 and 62. The synchronizer element 58 is axially shiftable on the external splines of the shaft hub 48 and further has limited angular movement relative to the hub 48. The element 58 has a central neutral position as shown in Fig. 2, from which position it is axially shiftable, axial shifting being resisted by detent means of any suitable type, shown here as one or more spring loaded balls 64. As best shown in Fig. 4, the external splines on the shaft hub 48 are separated by an annular groove 66 and an adjacent pair of splines are omitted to provide a wide axial groove 68. The element 58 is in the form of a ring having a plurality of spokes 70 in which the detent means 64 are respectively carried and the inner portions of which provide a relatively wide tooth 72. The width of the tooth 72 is such that it must be axially alined with the wide groove 68 before axial shifting of the element 58 relative to the shaft hub 48 can occur. In other words, the element 58 and shaft hub 48 may have different speeds so that one tends to over run the other, causing the wide tooth 72 on the element 58 to become misalined with the wide groove 68 on the hub 48, thereby effecting what is conventionally known as a blocker arrangement. After the speeds of the two cross or synchronize, axial alinement is achieved and shifting can be completed.

The clutch member 54 has a synchronizer portion thereon in the form of an annular internal conical face 74 which is adapted to cooperate with the external cone 60 on the synchronizer element 58. The clutch member 56 has a similar internal conical face 76 for cooperation with the other external cone 62 on the element 58. The two clutch members 54 and 56 are straddled by a shifter member 78 which carries, in any suitable manner, a pair of depending arms 80 and 82 engageable respectively with outer radial faces of the members 54 and 56. The shifter 78 is carried for sliding movement parallel to the shaft 28 as by a shifter rod 84.

The operation of the synchronizing transmission is as follows. Fig. 2 shows the parts in their neutral positions. The clutch members 54 and 56 are mounted respectively on their externally splined hubs 50 and 52 and both are free from engagement with the shaft hub 48. There is no contact between the synchronizer faces 60—74 or 62—76. When the engine clutch 18 is engaged, the engine 16 drives the shaft 28. As long as the clutch members and shift member are neutrally positioned as in Fig. 2, the vehicle is not driven. If the shifter member 78 is moved to the right from its Fig. 2 position, the clutch member 56 is moved toward the clutch member constituted by the shaft hub 48. Simultaneously, the clutch member 54 is shifted on the external splines of the hub 50 but in a direction away from the shaft hub 48. In the first phase of movement to the right, the synchronizer cone 76 on the clutch member 56 first contacts the external synchronizer cone 62 on the element 58. In effecting the first engagement of the transmission with the vehicle at a standstill, the engine clutch 18 will normally be disengaged. Engagement between the synchronizer cone portions will slow down the engine shaft to a standstill, so that the blocker effect at 72—68 is overcome. This enables splined connection between 52, 56 and 48, whereupon the engine clutch may be reengaged to start the vehicle, the forward speed of which will be dependent in part upon the ratio between the gears 32 and 36. Since the diameter of the gear 32 is quite a bit smaller than that of the gear 36, the forward speed will be relatively low. In the meantime, the other gear 30, being journaled on the shaft 28 and being in constant mesh with the counter shaft gear 34, will be rotating idly at a relatively lower speed.

When it is desired to shift from the low range just described to a high range established by the different ratio between the gears 30 and 34, the shifter member 78 is moved to the left. The first phase of movement will effect disengagement between the clutch member 56 and the shaft hub 48, followed by synchronizing engagement between the synchronizer cone 74 of the clutch member 54 and the synchronizer cone 60 of the element 58. After synchronizing of the speeds of the shaft hub 48 and gear 30 is accomplished, the blocking effect at 72—68 is overcome and the clutch member 54 may be shifted across the junction between the gear hub 50 and the shaft hub 48 to establish a positive driving connection. It will be noted that the frictional drag of the shifter member 78 is placed on the clutch member 54 which in turn is splined to the high speed gear 30. This is consistent with the idea of putting the shifter drag on the element driven by the rear wheels. The shaft 28 and the clutch driven disc are the parts whose speeds are changed by the synchronizing device. Since, in shifting down from driving connection with gear 30 or second gear to driving connection with gear 32 or first gear, the shaft 28 and its clutch driven disc must be speeded up, it is necessary that the shifter drag be placed upon the element tied in with the rear wheels since the shifter drag on this element will not materially affect the speed of gears 30 and 32 because the vehicle inertia will sustain their speed.

The arrangement is one of simplicity and compactness, lending itself to a design in which the hubs 50 and 52 are respectively formed as integral parts of the gears 30 and 32. The axial dimensions of the synchronizer parts are considerably reduced and are contained in the space between the gears 30 and 32. Other features of the invention not categorically enumerated will occur to those versed in the art, as will many modifications and alterations in the preferred embodiment of the invention disclosed, all of which may be achieved without departing from the spirit and scope of the invention.

What is claimed is:

1. A synchronizing transmission, comprising: a driving shaft having an externally splined hub fixed thereto; first and second driven gears journaled on the shaft in coaxially spaced apart relation with the shaft hub between them, said gears respectively having first and second externally splined hubs respectively axially adjacent to opposite sides of and containing splines like the shaft hub; first and second internally splined clutch members splined respectively to and for axial shifting on the first and second gear hubs, each clutch member being shiftable onto the shaft hub while retaining its splined connection with its own gear hub; a synchronizer element keyed to the shaft hub in a neutral position axially centrally between the clutch members and detent-connected to said shaft hub for axial displacement to either side of said neutral position; first and second synchronizer portions respectively on the clutch members and axially shiftable respectively therewith in advance of effectuation of the splined connection of the respective gear hub to the shaft hub so as to first engage the synchronizer member for synchronizing the speeds of the respective gear and shaft and then to displace said synchronizer member axially while effecting said splined connection; first and second drive gears in constant mesh respectively with the first and second driven gears; and means cooperative with and engaging the clutch members for shifting the clutch members selectively in opposite directions to first synchronize speeds as aforesaid and then to effect the respective splined connection.

2. The invention defined in claim 1, in which: the synchronizer element comprises an annular element having axially opposite cones respectively facing the clutch members, and each clutch member synchronizer portion comprises an internal annular conical face cooperative with the respective cone on the synchronizer element.

3. A synchronizing transmission, comprising: a driving shaft having a toothed driving clutch member driven thereby; first and second driven gears coaxially journaled relative to the driving clutch member and spaced apart with said member between them; first and second drive gears respectively in mesh with the first and second driven gears; first and second toothed driven clutch members carried respectively by the first and second driven gears, each driven clutch member being rotatable with and axially shiftable relative to its driven gear for engagement with and disengagement from the driving clutch member; a driving synchronizer member rotatable with the driving clutch member; first and second driven synchronizer members fixed respectively to the driven clutch members so that each driven clutch member when shifted axially toward the driving clutch member first engages the respective synchronizer members prior to engaging the respective clutch members; and means cooperative with and for shifting one driven clutch member in one direction to synchronize and then positively engage one driven clutch member with the driving clutch member and in the opposite direction to synchronize and then positively engage the other driven clutch member with the driving clutch member.

4. In a vehicle having a power plant, traction wheels and a synchronizing transmission in the power train from said power plant to said wheels, the improvement comprising toothed driving and driven elements respectively connected to the power plant at wheels and adapted to be engaged with and disengaged from each other, a two-way synchronizer having a central synchronizer member connected to and driven by the power plant, a pair of axially shiftable synchronizer members connected to and driven by the wheels for selective synchronizing cooperation with the power-plant-driven member to synchronize the speeds of rotation of said elements for facilitating interengagement thereof and means engaging and for selectively shifting the wheel-driven synchronizer members relative to the power-plant-driven member so that the shifting drag is placed on the shifted wheel-driven member.

References Cited in the file of this patent
UNITED STATES PATENTS

| | | |
|---|---|---|
| 1,809,976 | Kinney | June 16, 1931 |
| 2,515,114 | Chilton | July 11, 1950 |